United States Patent [19]

Scaduto

[11] Patent Number: 4,927,169
[45] Date of Patent: May 22, 1990

[54] SUSPENSION SYSTEM WITH CONSTANT CAMBER

[76] Inventor: Onofrio Scaduto, 1623 S. 56th Ct., Cicero, Ill. 60650

[21] Appl. No.: 288,991

[22] Filed: Dec. 23, 1988

Related U.S. Application Data

[63] Continuation-in-part of Ser. No. 212,218, Jun. 27, 1988, Pat. No. 4,854,603.

[51] Int. Cl.$^5$ .............................................. B62D 17/00
[52] U.S. Cl. .................................. 280/661; 280/112.1
[58] Field of Search ............. 280/661, 675, 772, 112.1

[56] References Cited

U.S. PATENT DOCUMENTS

| | | | |
|---|---|---|---|
| 4,373,743 | 2/1983 | Parsons, Jr. | 280/661 |
| 4,491,341 | 1/1985 | Maebayashi | 280/661 |
| 4,616,845 | 11/1986 | Pettibone | 280/688 |

Primary Examiner—Richard A. Bertsch
Attorney, Agent, or Firm—Baker, Maxham, Jester & Meador

[57] ABSTRACT

An automobile suspension system has linkage and geometry for compensating for roll and dip of the chassis during cornering for maintaining a substantially zero camber of the vehicle wheels during roll of the vehicle chassis.

21 Claims, 1 Drawing Sheet

SUSPENSION SYSTEM WITH CONSTANT CAMBER

REFERENCE TO RELATED APPLICATIONS

The present application is a continuation-in-part of my co-pending application Ser. No. 212,218, filed June 27, 1988, and entitled "CONSTANT CAMBER SUSPENSION SYSTEM", now U.S. Pat. No. 4,854,603.

BACKGROUND OF THE INVENTION

The present invention relates to automobile suspensions and pertains particularly to a suspension system having geometry and linkages for maintaining constant chamber.

Vehicle suspension systems include various combinations of springs (coil, leaf, air or torsion bar), axle housing, torque arms, A-frames, anti-roll bars, stabilizers, shock absorbers, and so forth. These components have been assembled in various combinations in an effort to produce the desired ride, handling and performance characteristics of the vehicle.

In a typical suspension system, the vehicle chassis or body is supported on the wheels in a manner to enable the wheels to rise and fall independent of the chassis to accommodate uneven road conditions. The changes in the spacing between wheels, axles and the body chassis due to turning, uneven road and other similar conditions are accommodated by arms, linkages, struts, and are cushioned by springs. System oscillations are limited by dampers which are usually called shock absorbers.

The ride and performance or handling of the vehicle is affected by many factors related to the suspension system. The suspension system must accommodate, yet resist tendency of the vehicle to pitch when traversing bumps and dips, and to resist roll when turning. A given suspension system will perform best when properly aligned and tuned.

There is a continuing effort to improve the economy, performance, road handling, and reliability of automobiles. A good suspension system will provide improved performance and road handling, and in most instances will result in improved economy and reliability. One of the factors that affects road handling and performance is tire grip or adhesion of the tires to the road surface. An important factor that affects tire grip is camber, which is the angle the tire makes with the vertical. Positive angle tilts the top of the wheel out, and negative camber tilts the top of the wheel in.

Most modern tires have a wide flat tread surface. It is important to keep the wide surface flat on the road surface for optimum traction and performance and to reduce wear. Camber angle is critical to tire traction and to vehicle handling and performance. The camber angle is controlled by the suspension linkage and its geometry. It is desirable to keep the camber angle zero or near zero at all times to optimize road handling and performance.

In my aforementioned application, I disclose an improved system having linkage for maintaining a constant camber. However, the suspension linkage is unsatisfactory for certain applications.

It is, therefore, desirable to provide an improved suspension system capable of maintaining optimum camber.

SUMMARY AND OBJECTS OF THE INVENTION

It is the primary object of the present invention to provide an improved automobile suspension system.

In accordance with the primary aspect of the present invention, a suspension system for an automobile comprises upper and lower control members pivotally mounted to a wheel assembly and a vehicle chassis, with one of the upper and lower control members being connected to the chassis by means of a moveable pivot that enables shifting of the control member for compensating for chassis roll for maintaining zero camber of the vehicle wheels.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
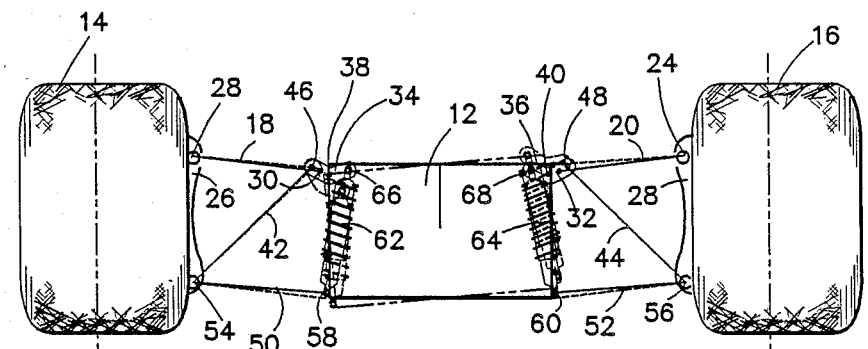
FIG. 1 is a front elevation view of a suspension system embodying a preferred embodiment of the invention in a straight ahead position and a left turn position shown in phantom.

Referring to FIG. 1 of the drawings, there is a front elevation view of a vehicle suspension system, designated generally by the numeral 10, embodying a preferred embodiment of the invention. As illustrated, there is disclosed a vehicle chassis or body 12, which is supported on a pair of wheels 14 and 16 by means of a suspension system. The suspension may be for either front or rear, or both, and details of drive and steering are not illustrated herein. The illustrated and described systems herein will be described as the front end of the vehicle coming toward the reader/viewer.

The system, as illustrated, comprises a double wishbone type wherein both upper control members or arms have a somewhat A or wishbone configuration (not shown). A pair of control arms 18 and 20 extend from a common body member or chassis 12 at one end. This type suspension system is commonly used on racing cars but may also be used on passenger cars. Each of the upper arms 18 and 20 are each connected at an outer end thereof 22 and 24 to the uppermost end or portion of a respective one of wheel and axle assemblies 26, and 28. The upper arms are connected at their inner ends 30 and 32 to moveable pivots, such as pairs of swing or control levers 34 and 36 on each side of the vehicle chassis. The control levers 34 and 36 are pivotally connected to the chassis at pivots 38 and 40 which function as fulcrums for the control levers.

A pair of diagonal control links 42 and 44 are pivotally connected at an upper end to a pivot point 46 and 48 at an outer end of the control levers 34 and 36 and at a lower end to a pivot point 54 and 56 at the lower end of the wheel assemblies 26 and 28. The lever arm on levers 34 and 36 for the links 42 and 44 are about twice that for the upper arms 18 and 20. This, as will be subsequently explained, creates the necessary force balance for maintaining a substantially zero camber.

A pair of lower control arms 50 and 52 are substantially like the upper arms and are pivotally connected at the outer ends thereof by pins 54 and 56 to the lowermost position of the wheel axle assemblies 26 and 28. These arms 50 and 52 are pivotally connected at their inner ends directly to pivot pins 58 and 60 directly to the chassis. The upper arms and lower arms can be of the same length or slightly different in length, but form a four-bar linkage with the wheel assembly. The swing or control levers enable the upper arms to extend and retract in order to maintain the wheels vertical (zero camber) during roll of the chassis when cornering. However, one can maintain zero degrees camber over a one wheel bump only if upper and lower arms are parallel and of the same length.

A pair of spring and shock assemblies 62 and 64 are connected at an upper end to the innermost end 66 and 68 of the control levers 34, 36, and at the lower end to the inner pivot 58 and 60 of the lower control arms 50 and 52 to the chassis. These links and springs support the vehicle chassis between the wheels. Other geometric arrangements for the spring support of the chassis may also be used but are not illustrated.

This linkage construction and geometry is such that the camber of the wheels, which are preferably set at zero camber, will maintain that zero camber throughout a turn of the vehicle and roll of the chassis. In other words, the wheels will maintain a constant camber (i.e. vertical position) throughout the turn while permitting the chassis to roll a small amount about its longitudinal roll axis.

As shown in phantom in FIG. 1, when the vehicle enters a turn to the left for example (the viewer's right), the chassis will pivot or roll about a roll center or axis thereof, such that the upper control arm links 18, 20 will move relative to their initial position and relative to the chassis to pull the upper portion of the right wheel (viewer's left) inward, and push the upper portion of the other or left wheel (viewer's right) outward through the action of the control levers 34 and 38 at the upper portion of the chassis. Thus, the tilt or roll of the chassis will be accommodated and compensated by the floating inner ends of the control arms.

The control members or levers 18 and 20 are used to enable the chassis 12 to roll or pivot, yet maintain a zero camber of the wheels 14 and 16. It should be noted that the control levers 34 and 36 are illustrated as being considerably shorter in length than the control arms 18 and 20 and are angled inwardly toward the chassis roll axis. However, the control levers can be substantially any length so long as the angle and leverage between them and the control arms are proper. The two arms of the lever are at an angle to one another and extend to opposite sides of the pivot or fulcrum.

Figure 2:
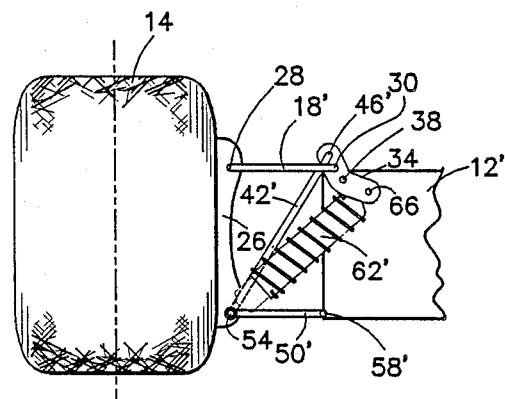
FIG. 2 is a front elevation view showing one side of an alternate embodiment.

Referring now to FIG. 2 wherein the same or identical members are represented by the same numeral and equivalent members by the same number primed, it is seen that the upper and lower control arms 18' and 50' and the linkage of the system are identical to the prior embodiment, with the exception that they are preferably slightly shorter in length. The control lever 34 is shown as being identical and connected the same to the chassis and linkage. In this embodiment, the lower end of the spring and shock assembly 62' is connected to the lower portion of the wheel assembly at pivot 54, rather than to the chassis as in the prior embodiment. This provides a slightly more compact arrangement of the suspension system, which would be more suitable for passenger cars and the like. The force acting on pivot point 66 of the control lever 34 will be slightly different due to the different connection of the spring and shock.

Referring now to FIG. 3 wherein again the same or identical members are represented by the same numeral and equivalent members by the same number primed, it is seen that the upper A arms of the linkage system are identical to the prior embodiment, with the inner ends of the control arms 18' being pivotably connected to lever 34', which is connected at the inner end at pivot or fulcrum 38' to the chassis. In this embodiment, the upper ends of the respective lower spring and shock assemblies 62' are connected at the upper end to the chassis 12 at 66', rather than to the inner end of the control lever. The forces on the lever 34' are thus balanced between the control arm 18 and the control link 42, without forces being applied by the spring and shock assembly other than through link 42'.

It is seen from the geometry of this linkage that the upper control levers 34' and 36' are angled from their connection or pivoting to the chassis outward from the roll center or roll axis of the vehicle chassis. Both the upper control levers extend at an angle of around sixty degrees to the vertical. The angles and length of the respective control levers must be sufficient to accommodate the roll of the chassis and maintain the wheels at the predetermined camber.

Figure 3:
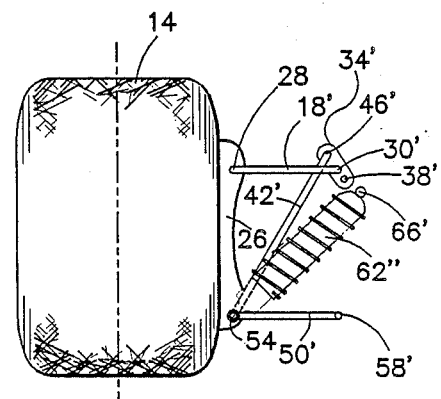
FIG. 3 is a front elevation view like FIG. 2 of a further embodiment in the straight ahead position.

With the linkage shown in FIG. 3, the chassis will roll about a center of roll between the top and bottom thereof, with the chassis 12 tilting and the control arms 18' and 50' and the swing or control levers 34' moving such that the wheels maintain a vertical or zero camber position. Lever 34' will align and move with arm 18, pulling the top of the wheel 14 in while arm 50' pushes the bottom out.

Figure 4:
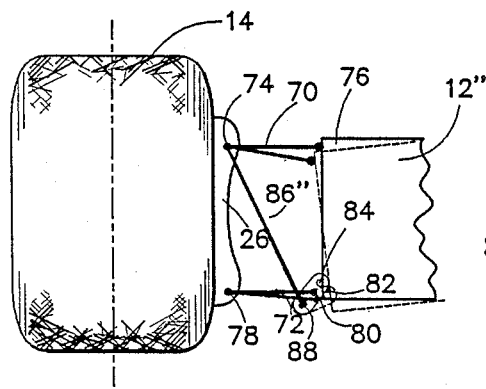
FIG. 4 is a front elevation view like FIG. 2 of another embodiment in the straight ahead position.
Figure 5:
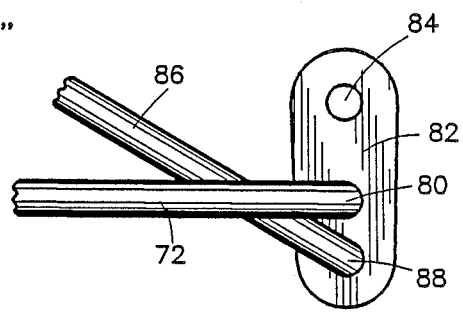
FIG. 5 is a front elevation view of a link member of still another embodiment.

Referring now to FIGS. 4 and 5 of the drawing, there is illustrated a modification in a suspension system to place the control lever at the lower portion of the chassis. The major part of the suspension system is identical to that of FIG. 1, but with lower control arms pivotally connected to a control lever which is pivotally mounted directly to the chassis 12. A wheel assembly 26 with wheel 14 is mounted by means of upper control arm 70 and lower control arm 72 to a chassis 12. The upper control arm is pivotally connected at its outer end at 74 to the wheel assembly and at its inner end at 76 to the chassis.

The lower control arm is connected at its outer end at 78 to the lower end of the wheel assembly, and at its inner end at 80 to a control lever 82 to the lower portion of the chassis. The lever 82 is pivotally connected at a pivot or fulcrum 84 at an upper end to the chassis. A diagonal control rod 86 is pivotally connected at an outer end at 74 to the wheel assembly, and at its inner end at 88 to the control lever 82.

In operation, when the vehicle chassis rolls about its longitudinal axis, the top portion of the chassis will push outward, and the lower portion will pull inward, tending to tilt the wheel 14. However, this linkage will allow the lower portion of the chassis to pull inward without pulling the wheel in. Thus, the camber of the wheels will be maintained substantially constant during cornering and when traversing bumps and dips. The combination of the weight of the vehicle and the inertial forces in a turn will act to oppose the tendency of the wheels to lean, and will maintain a substantially constant camber.

These embodiments, as will be appreciated, have a number of common features, namely that either the upper or lower control arms or members are permitted to float or move outward at the inner end relative to the vehicle chassis. The linkage and its geometry are such that forces tending to cause a rolling of the chassis is transferred to and move the upper or lower portion of the wheel assembly relative to the chassis in or out, in a manner to maintain the respective wheel assembly substantially at vertical or zero camber.

I have found that in the double wishbone system, with the upper lever, I can maintain a zero camber for cornering and for one wheel bump conditions. In the combination, with the control arms connected to the lower control lever, I can maintain the wheels substantially at zero camber during cornering and one wheel bump conditions. This is to say that there will be a slight variation in camber from zero up to as much as two and one-half degrees in some extreme cases for this embodiment.

While the principal of the present invention has been illustrated by means of a number of specific embodiments, it is to be understood that numerous changes and modifications may be made therein without departing from the spirit and scope of the invention as defined in the appended claims.

I claim:

1. A vehicle suspension system comprising:
   a lower control arm having an outer end for connecting to a lower portion of a wheel assembly and an inner end for connecting to one side of a vehicle chassis;
   an upper control arm having an outer end for connecting to an upper portion of said wheel assembly and an inner end for connecting to said vehicle chassis;
   a control lever pivotally connected at a fulcrum to said chassis and having pivot means spaced from said fulcrum for pivotally connecting the inner end of one of said upper control arm and said lower control arm via said control lever to said chassis; and
   a control rod having an inner end connected to said control lever and an outer end connected to one of said upper portion and said lower portion of said wheel assembly for maintaining a wheel of said wheel assembly at a substantially constant chamber in response to movement about the roll axis of said chassis.

2. A vehicle suspension system according to claim 1 wherein:
   the inner end of said upper control arm is connected by said control lever to said chassis.

3. A vehicle suspension system assembly according to claim 2 wherein:
   said upper control arm and said control rod is connected to a common side of said control lever.

4. A vehicle suspension system assembly according to claim 3 wherein:
   said upper control arm and said control rod cross at a position adjacent said control lever.

5. A vehicle suspension system according to claim 4 wherein:
   the inner end of said upper control arm is connected to said control lever at a position closer to said fulcrum than said control rod.

6. A vehicle suspension system assembly according to claim 5 wherein:
   a suspension spring is connected between a lower portion of said suspension system and said control lever.

7. A vehicle suspension system assembly according to claim 6 wherein:
   said spring is connected to said control lever at an end opposite said fulcrum from said connection of said upper control arm and said control rod.

8. A vehicle suspension system according to claim 1 wherein:
   the inner end of said lower control arm is connected by said control lever to said chassis.

9. A vehicle suspension system according to claim 8 wherein:
   said lower control arm and said control rod is connected to a common side of said control lever.

10. A vehicle suspension systems according to claim 9 wherein:
    the inner end of said lower control arm is connected to said control lever at a position closer to said fulcrum than said control rod.

11. A vehicle suspension system for maintaining zero degree camber comprising:
    a lower control arm having an outer end for connecting to a lower portion of a wheel assembly and an inner end for connecting to one side of a vehicle chassis;
    an upper control arm having an outer end for connecting to an upper portion of said wheel assembly and an inner end for connecting to said vehicle chassis;
    a control lever pivotally connected at a fulcrum to said chassis for pivotally connecting the inner end of one of said upper control arm and said lower control arm to said chassis; and
    a control rod having an inner end connected to said control lever on a common side of said fulcrum with said control arm and an outer end connected to one of said upper portion and said lower portion of said wheel assembly for maintaining a wheel of said wheel assembly at a substantially constant camber in of said wheel assembly in response to a roll force of said chassis about the roll axis of said chassis.

12. A vehicle suspension system according to claim 11 wherein:
    the inner end of said control arm is connected to said control lever at a position on the order of about twice the distance from said fulcrum as the connection of said control arm thereto.

13. A vehicle suspension system assembly according to claim 12 wherein:
    the inner end of said upper control arm is connected by said control lever to said chassis.

14. A vehicle suspension system according to claim 13 wherein:
    a suspension spring is connected between said control lever and a lower portion of said suspension system.

15. A vehicle suspension system assembly according to claim 12 wherein:
    the inner end of said lower control arm is connected by said control lever to said chassis.

16. A vehicle suspension system according to claim 15 wherein:

said lower control arm and said control rod are connected to the lower end of said control lever.

17. A vehicle suspension system for maintaining zero degree camber comprising:
  right and left suspension assemblies for mounting right and left wheel assemblies to a vehicle chassis;
  said suspension assemblies each comprising an upper control arm and a lower control arm, each having an outer end for connecting to a wheel assembly and an inner end for connecting to a chassis,
  a control lever pivotally connected to said chassis at a fulcrum and having a free outer end connecting on of said upper and lower control arms to said chassis for enabling said control arm to extend and retract for maintaining a wheel assembly at a constant camber in response to tilt of said chassis, said control lever having a length that is less than one-half the length of the control arm, and
  a control rod having an inner end connected to said control lever on a common side of said fulcrum with said control arm and an outer end connected to one of said upper portion and said lower portion of said wheel assembly for maintaining a wheel of said wheel assembly at a substantially constant camber in of said wheel assembly response to a roll force of said chassis about the roll axis of said chassis.

18. A vehicle suspension system assembly according to claim 17 wherein:
  the inner end of said upper control member is connected by said control lever to said chassis.

19. A vehicle suspension system according to claim 18 wherein:
  a suspension spring is connected between said control lever and a lower portion of said suspension system 20. A vehicle suspension system assembly according to claim 17 wherein:
  the inner end of said lower control arm is connected by said control lever to said chassis.

21. A vehicle suspension system according to claim 20 wherein:
  said lower control arm and said control rod are connected to the lower end of said control lever.

* * * * *